Feb. 15, 1966

B. R. NELSON 3,235,009

TRAVELING IRRIGATION SPRINKLER AND METHOD
OF IRRIGATION SPRINKLING

Filed Dec. 3, 1963

INVENTOR
BARTON R. NELSON

BY
ATTORNEYS

Feb. 15, 1966                    B. R. NELSON                    3,235,009
              TRAVELING IRRIGATION SPRINKLER AND METHOD
Filed Dec. 3, 1963        OF IRRIGATION SPRINKLING        7 Sheets-Sheet 4

INVENTOR
BARTON R. NELSON
BY
Cushman, Darby & Cushman
ATTORNEYS

INVENTOR
BARTON R. NELSON

BY Cushman, Darby & Cushman
ATTORNEYS

Feb. 15, 1966    B. R. NELSON    3,235,009
TRAVELING IRRIGATION SPRINKLER AND METHOD
OF IRRIGATION SPRINKLING
Filed Dec. 3, 1963    7 Sheets-Sheet 6

INVENTOR
BARTON R. NELSON
BY
Cushman, Darby & Cushman
ATTORNEYS

Feb. 15, 1966  B. R. NELSON  3,235,009
TRAVELING IRRIGATION SPRINKLER AND METHOD
OF IRRIGATION SPRINKLING
Filed Dec. 3, 1963  7 Sheets-Sheet 7

INVENTOR
BARTON R. NELSON

BY
Cushman, Darby & Cushman
ATTORNEYS

United States Patent Office 3,235,009
Patented Feb. 15, 1966

3,235,009
TRAVELING IRRIGATION SPRINKLER AND METHOD OF IRRIGATION SPRINKLING
Barton R. Nelson, Peoria, Ill., assignor to L. R. Nelson Mfg. Co., Inc., Peoria, Ill., a corporation of Illinois
Filed Dec. 3, 1963, Ser. No. 327,768
2 Claims. (Cl. 172—1)

This invention relates to sprinkling and more particularly to an improved method and apparatus especially useful in agricultural irrigation of fields and the like.

The problems presented in sprinkler irrigating agricultural fields are considerably more imposing than those presented in sprinkling lawns and other grassy areas such as football fields, golf courses and the like. While traveling sprinklers have been successfully employed for lawn sprinkling and athletic field sprinkling, heretofore sprinkler irrigation of agricultural fields by traveling sprinklers has not been adopted. The sprinkler irrigation systems currently employed are fixed during watering and usually embody the use of fixedly connected aluminum pipe sections which are usually 30′ in length but may be as long as 40′. The diameter of the pipe section varies as desired from approximately 4″ to as high as 8″. In a typical installation, a series of pipe sections are coupled together to a total length of approximately a quarter mile or more. Riser pipes are secured to the coupling means at intervals of approximately 60′, each riser having a separate nozzle on its upper end. Water is pumped to the spray nozzles and the spray from each nozzle extends in a radius of approximately 40′. In a normal operation, spraying will be continued for a period of approximately 8–10 hours and then the pipe sections must be moved over a distance of approximately 60′ to irrigate the next area of the field.

This system has achieved a measure of acceptance, particularly in those areas where manual labor can be obtained inexpensively. When it is considered that a pipe section with a riser attached can weigh anywhere from 35 to 50 pounds and that the ground from which the pipe sections must be moved has been soaked with water for an 8–10 hour period, it can be seen that the manual labor required to effect movement of the pipes is difficult and extremely unpleasant. The labor problem is complicated and made more difficult where the system is utilized in a corn field or the like, where the pipe sections must be carried over the tops of the corn stalks in order to prevent damage.

There have been many proposals made to alleviate the labor problem presented in sprinkler irrigating with an aluminum pipe section system mentioned above. In general, these proposals have not proven entirely satisfactory. Thus, while the benefits of sprinkler irrigation are well recognized, the adoption of this type of irrigation has not become as widespread as is indicated by the benefits to be derived, primarily because of the labor problem presented in setting up or moving the system from one location in the field to the next.

The problem presented is essentially one of handling the extensive lengths of conduit which are necessary in dealing with the capacity of water involved in sprinkler irrigation. The solution to this problem embodied in the present invention is two-fold. First, the sprinkling means of the system is self-propelled during the sprinkling operation, enabling the sprinkling means to cover a maximum area during operation with a minimum amount of conduit. Second, the conduit provided is in the form of a flexible collapsible hose which is capable of being dragged along the field by the traveling sprinkler during operation and which is also capable of being reeled up or otherwise formed into a compact bundle for transportation to the next location of operation in the field in a condition free of any contained water.

In accordance with the principles of the present invention, the first step toward the solution is accomplished by connecting one end of the hose, for example 600′ in length, to a source of water under pressure in the field and beginning the sprinkling operation with the hose completely extended. In this way, the sprinkler can then travel in a direction toward the source for 600′ and in a direction away from the source for an additional 600′, thus making it possible to irrigate an area of the field having a length substantially double that of the length of hose.

The present system also embodies a novel method of guiding or steering the sprinkler during its travel which enables this result to be obtained. Several methods of guiding or steering traveling lawn sprinklers or traveling athletic field sprinklers have been employed. The usual method is to utilize the hose itself as the guiding medium. However, this method clearly limits the guided path of movement to the length of the hose. Another method proposed is the utilization of a guide cable which, while not limiting the travel to the length of the hose, generally limits the movement of the sprinkler to a straight path unless an elaborate system for changing the direction is employed. Moreover, the cable system adds weight and cost to the apparatus and presents difficulties in the setting up operation.

In accordance with the principles of the present invention the sprinkler is guided in its movement through the field by sensing the elongated contour of a furrow formed in the field. In this way the present system is readily applicable to existing conditions and particularly to those fields where rows of crops are planted. The furrow may either be formed by the use of the apparatus itself or with conventional furrow-forming equipment separate from the present apparatus.

Accordingly, it is a further object of the present invention to provide a steerable traveling sprinkler having an improved furrow follower means capable of sensing the elongated contour of a pre-formed furrow and guiding or steering the traveling sprinkler along a path conforming with the elongated contour of the furrow.

The second step in the solution according to the present invention is the utilization of a continuous length of flexible and collapsible hose which is not only easily handled during the sprinkling operation but is particularly suited to simple and convenient handling during the movement of the sprinkling apparatus from one position of operation in the field to the next. Utilizing the example previously mentioned of a 600′ length of hose having, for example, a 3″ diameter, it can be appreciated that to handle such a length of hose with water contained therein would be a highly impractical situation. With the present system the hose is collapsed as it is wound up into a transportable bundle, thus eliminating the need for making and breaking connections in the conduit and providing a system where the entire conduit in the form of a hose can be handled in a relatively simple fashion.

Still another object of the present invention is the provision of a traveling sprinkler of the type described having a power driven reel mechanism thereon capable of progressively collapsing and winding up an extensive length of flexible collapsible hose into a compact bundle free of contained water for transportation from one area in the field to be sprinkled to another.

Still another object of the present invention is the provision of a traveling sprinkler of the type described having an improved water pressure operated propelling mechanism for moving the sprinkler along its predetermined path, which mechanism retains control of the movement of the sprinkler at all times, thus eliminating the possibility of free movement of the sprinkler down a grade or slope in the field.

Still another object of the present invention is the provision of a traveling sprinkler of the type described having improved means for initially unwinding and depositing an extensive length of hose in the field prior to the actual sprinkling operation.

Still another object of the present invention is the provision of a traveling sprinkler of the type described having improved means for shutting off the source of water under pressure when the sprinkler has reached the end of its predetermined path of travel.

These and other objects of the present invention will become more apparent during the course of the following detailed description and appended claims.

The invention may best be understood with reference to the accompanying drawings wherein an illustrative embodiment is shown.

Figure 19:
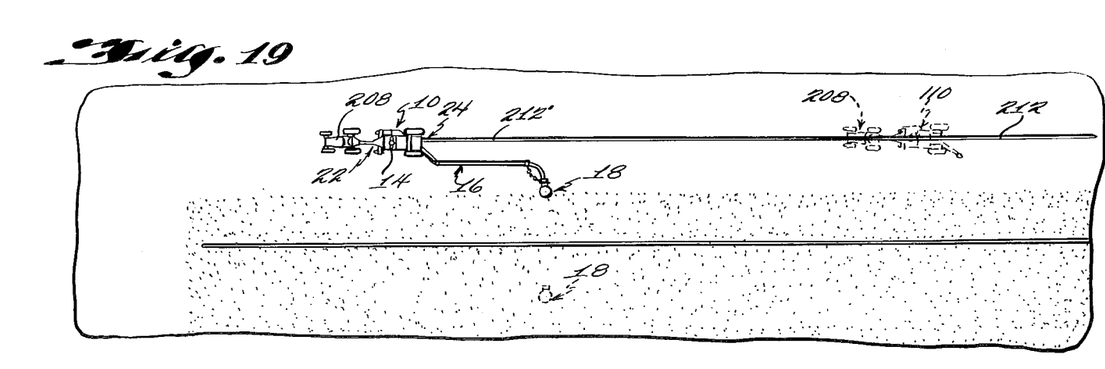
FIGURE 19 is a top plan view illustrating the initial steps in the preferred method of operating the apparatus of the present invention.
Figure 20:
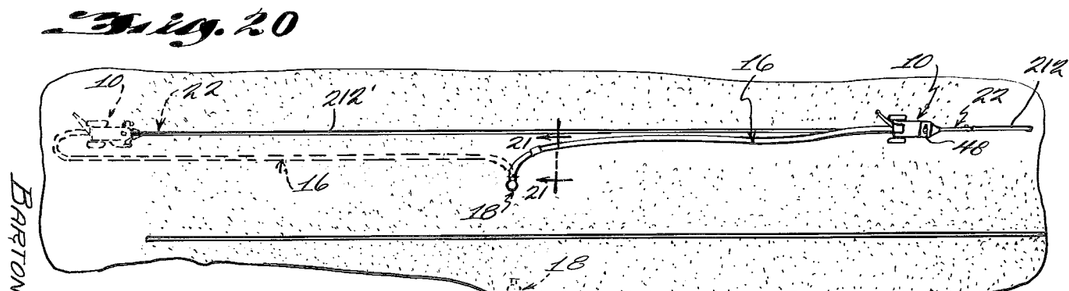
FIGURE 20 is a view similar to FIGURE 19 illustrating the final steps of the method.
Figure 21:
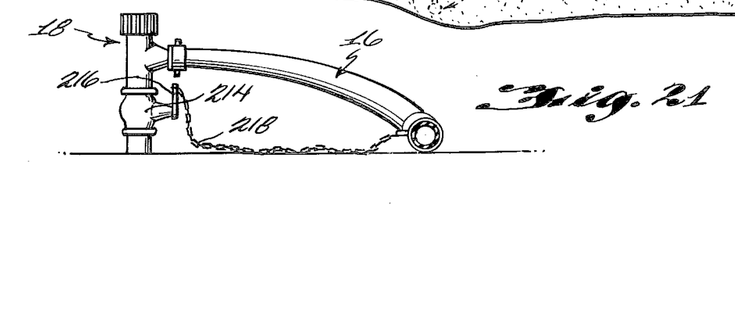
FIGURE 21 is an elevational view showing the automatic shut-off assembly for closing off the source of water under pressure when the apparatus reaches the end of its path of travel.

Referring now more particularly to FIGURES 1–5, there is shown therein an apparatus, generally indicated at 10, embodying the principles of the present invention. The apparatus includes a steerable wheeled frame assembly, generally indicated at 12, which supports a sprinkler assembly, generally indicated at 14, for movement along a predetermined path in a field to be sprinkled. Water under pressure is supplied to the sprinkler assembly 14 through a length of hose, generally indicated at 16, connectable with a source of water under pressure in the field, generally indicated at 18 (as shown in FIGURES 19–21). The sprinkler assembly carried by the frame assembly is propelled by a water pressure actuated propelling mechanism, generally indicated at 20 and shown in detail in FIGURES 7–11.

The frame assembly 12 is guided during its propelled travel by means of a furrow follower steering assembly, generally indicated at 22. Preferably, a furrow opener assembly 24 is mounted on the frame assembly so that the apparatus may be utilized in forming the furrow which is followed by the steering assembly. Finally, the apparatus includes a power operated reel assembly 26 around which the hose 16 is wound into a compact bundle for purposes of transportation.

The frame of the assembly 12 may be of any suitable construction and, as shown, is fabricated of angle iron stock into a skeletonized horizontally extending platform 28. Mounted on the forward portion of the platform 28 is a vertically extending bushing 30 which rotatably receives an upwardly extending shaft 32 fixed to the central bight portion of an inverted U-shaped yoke 34. A shaft or axle 36 is carried by the lower ends of the legs of the yoke 34 and a wheel 38 is suitably mounted on each end of the axle 36 in longitudinally spaced relation with respect to each other. The wheels 38 serve to support the forward end of the platform 28 and are steerably or pivotally mounted through the journalling of the stub shaft 32 within the bearing 30.

Figure 3:
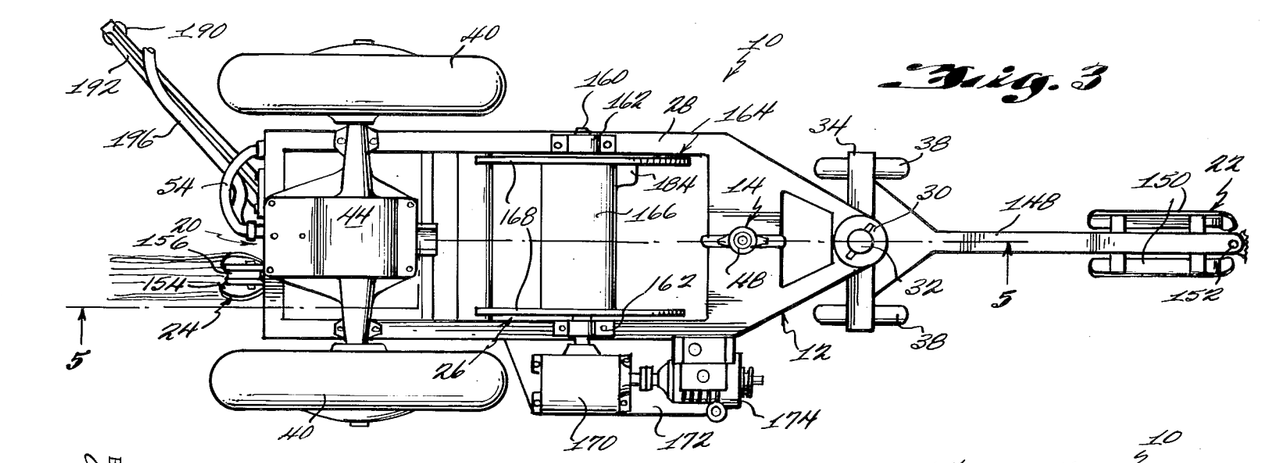
FIGURE 3 is a top plan view of the apparatus shown in FIGURE 1.
Figure 4:
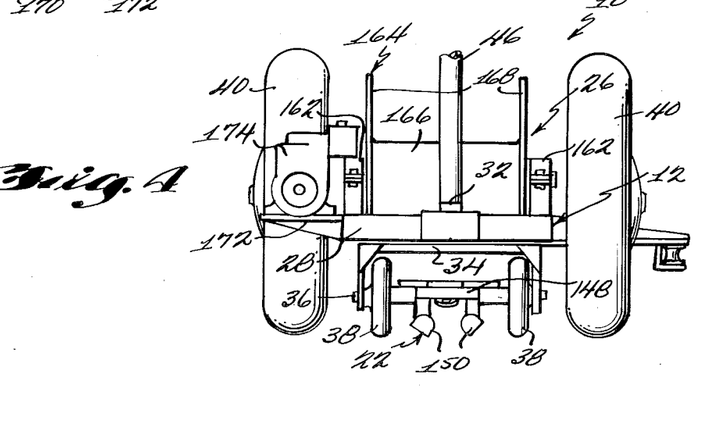
FIGURE 4 is a front elevational view of the apparatus shown in FIGURE 1.

The rearward portion of the platform is supported by a pair of rearward wheels 40 fixed to opposite ends of a drive shaft or axle 42. As best shown in FIGURE 3, the axle 42 is journaled within a casting or housing 44 suitably fixed to the rearward portion of the platform 28 within which the component parts of the propelling mechanism 20 are mounted.

The sprinkler assembly 14 includes a riser pipe 46 which is secured at its lower end to the platform 28 and has a sprinkler assembly 48 mounted on its upper end. The sprinkler assembly may be of any suitable construction, a preferred embodiment is a conventional step-by-step rotary sprinkler of the type currently employed in irrigation systems. In certain instances it is desirable, in accordance with the principles of the present invention, to utilize a sprinkler assembly which has a spray pattern somewhat less than a full circle pattern such as a three-quarter circle patern or the like. An example of an embodiment which may be employed in this regard is shown in Sharp et al. Patent 3,022,012, issued February 20, 1962.

The lower end of the riser pipe 46 is connected in communication with the upper end of a pipe fitting 50, the lower end of which is arranged to be detachably connected with one end of the hose 16. The fitting 50 includes a branch 52 which is connected through suitable conduit 54 with the propelling mechanism 20 to provide the water pressure necessary to operate the latter.

Figure 9:
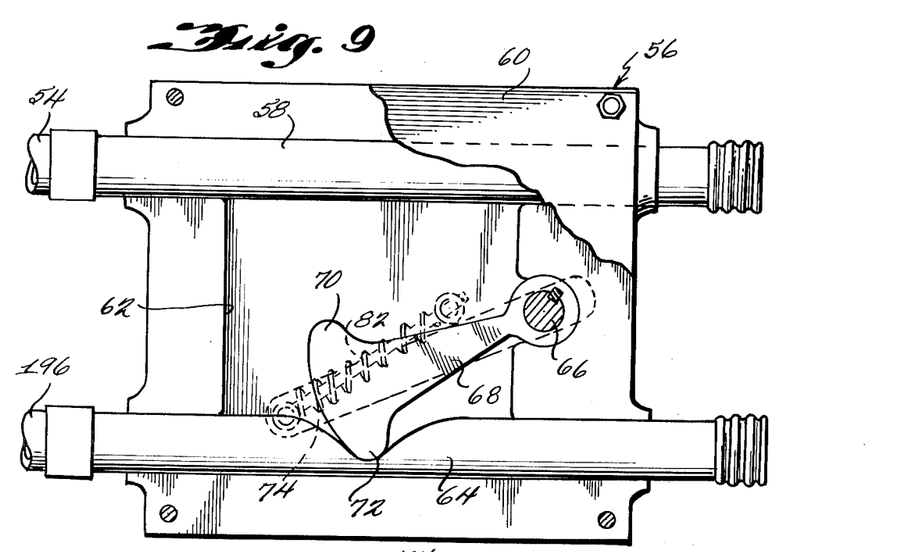
FIGURE 9 is an enlarged side elevational view, partly broken away, illustrating the valve assembly of the mechanism shown in FIGURE 7.
Figures 10, 11:
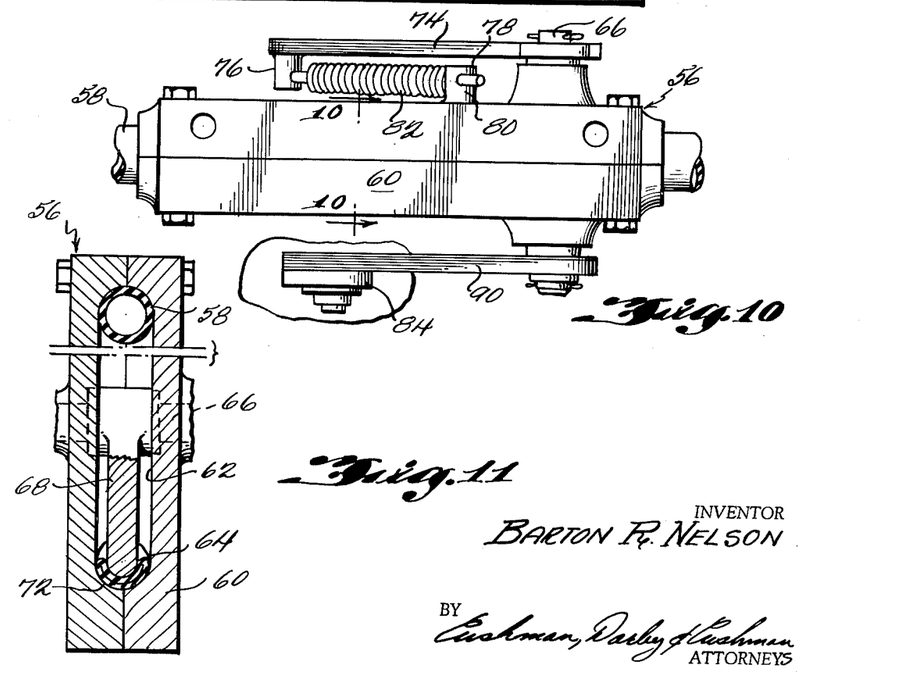
FIGURE 10 is a top plan view of the valve assembly sohwn in FIGURE 9.
FIGURE 11 is a sectional view taken along the line 11—11 of FIGURE 10.
Figure 12:
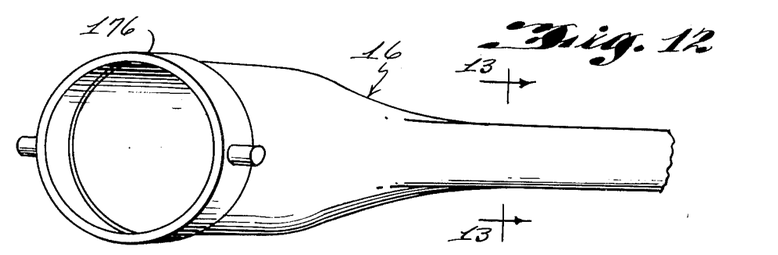
FIGURE 12 is a fragmentary perspective view of one end of the hose utilized with the apparatus of the present invention.

Referring now more particularly to FIGURES 7–11, the propelling mechanism 20 includes a reversing valve assembly 56 to which the inlet conduit 54 is connected. As best shown in FIGURE 9, the conduit 54 is connected to a flexible hose section 58 mounted within the upper portion of a housing 60 in horizontally extending relation. The housing includes a central chamber 62 which communicates with the lower central portion of the hose section 58 at its upper end and at its lower end with the central portion of a pipe section 64 of similar construction to the hose section 58 and mounted within the housing in parallel relation thereto.

Extending transversely through the housing 60 in a position adjacent one end of the chamber 62 is a shaft 66. Fixed to the shaft within the chamber 62 is one end of a valve arm 68. The outer end of the arm is provided with a pair of oppositely extending rounded hose engaging portions 70 and 72 which are adapted to engage and close the hose sections 58 and 64 respectively.

The arm portions 70 and 72 are retained in hose closing positions relative to the hose sections 58 and 64 respectively by an over center spring mechanism of any suitable construction. As shown there is provided an arm 74 which is fixedly secured at one end to one end of the shaft 66 and has a sleeve 76 pivotally mounted on the outer end thereof. A rod 78 is fixed at one end of the sleeve 76 and has its opposite end extending through an opening in a sleeve 80 pivotally mounted on the housing 60. A compression coil spring 82 is disposed in surrounding relation to the rod with its ends in abutting engagement with the sleeves 76 and 80.

As best shown in FIGURE 9, it will be noted that the axis of the sleeve 80 is disposed between the pivotal axis of the sleeve 76 and the axis of the shaft 66 when the arms 68 and 74 are disposed in their mid-position. In this way the spring 82 serves to resiliently urge the arm 68 into a position away from the central position on either side thereof. When the arm portion 70 is in closing engagement with the pipe section 58, inlet water pressure to the valve assembly 56 is closed off and the outlet hose section 68 is open. Conversely, when the arm portion 72 is in closing engagement with the hose section 64 the water in the system will be pressurized through the inlet hose section 58.

The valve mechanism 60 is moved between these opposed positions by a lost motion connection which, as shown, includes an elongated link 84 having an elongated slot 86 formed in the upper portion thereof for slidably and pivotally receiving a pin 88 mounted on the outer end of an arm 90, the inner end of which is suitably fixed to the opposite end of the shaft 66. The lower end of the link 84 is pivotally connected to the rearward end of an arm 92 the forward end of which is provided with a separable yoke 94. The yoke is journaled on the central portion of the rear axle 42 for pivotal oscillating movement.

The arm 92 is moved in one direction of pivotal oscillation by means of a diaphragm assembly 96. The diaphragm assembly may be of any suitable construction and, as shown, includes a dish-like lower casing 98 and a flanged upper frusto-conical casing section 100 secured together at their flanges with a resilient diaphragm 102 therebetween. Resting on the upper central portion of the diaphragm 102 is a circular piston-like member 104 carried by the arm 92. The inlet hose section 58 is communicated with the outlet hose section 64, as by a conduit 106, and the latter is connected through suitable conduit 108 and 110 to the lower central portion of the lower housing section 98.

Figure 7:
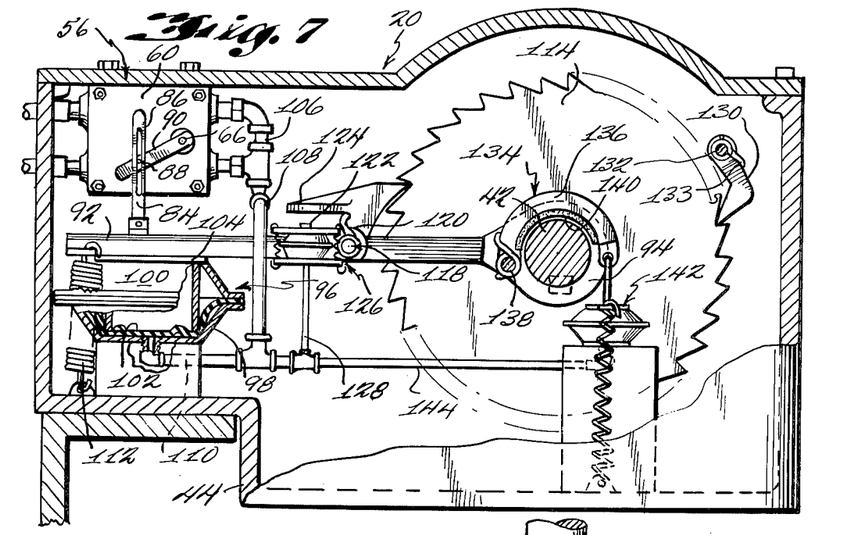
FIGURE 7 is an enlarged fragmentary sectional view illustrating the water pressure operated propelling mechanism of the apparatus.
Figure 8:
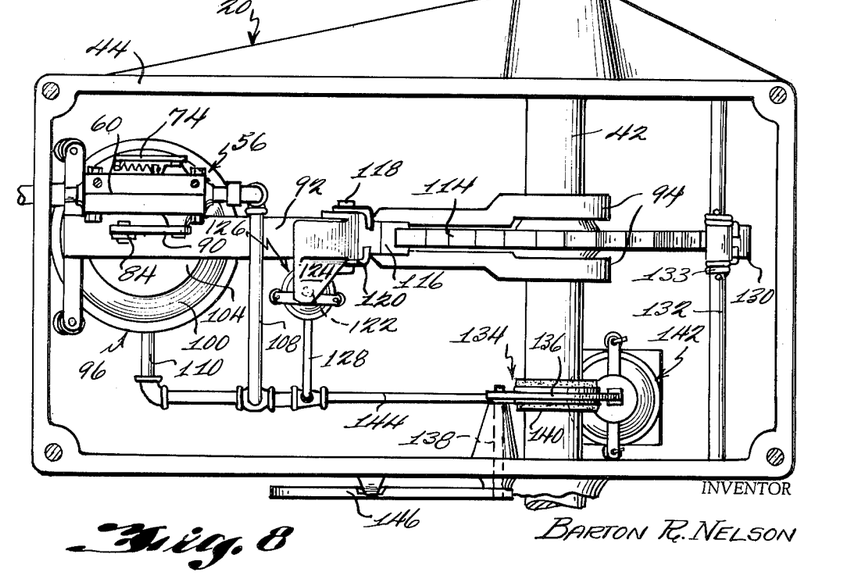
FIGURE 8 is a top plan view of the mechanism shown in FIGURE 7.

It can thus be seen that the introduction of water under pressure into the chamber, defined by the interior of the housing section 98 and the diaphragm 102, will serve to effect an upward movement of the outer end of the arm 92 or a clock-wise pivotal movement thereof as viewed in FIGURE 7. At a predetermined position in the upward pivotal movement of the outer end of the arm 92 the lower end of the slot 86 of the link 84 engages the pin 88 causing the arm 68 to move toward its central position and finally over the central position in the opposite direction. As soon as the arm is moved over the center position, the spring 82 serves to effect the final movement of the arm into its hose engaging position during which lost motion between the link and the arm 90 takes place. The arm 92 is moved in the opposite direction of its pivotal oscillating movement when the water pressure within the diaphragm chamber is communicated with the outlet line 64 by means of a pair of return springs 112 connected between the outer end of the arm and the casing 44.

The pivotal oscillating movement of the arm 92 through the operation of the diaphragm assembly 96 and the valve mechanism 56 is utilized to propel the apparatus. To this end, a toothed ratchet wheel 114 is fixed to the rear axle 42. A driving pawl or dog 116 is pivotally mounted, as at 118, on the arm 92 for movement into and out of engagement with the peripheral teeth of the ratchet wheel 114. Preferably, a spring 120 is provided for resiliently urging the pawl 116 into a position of engagement with the teeth.

In order to insure that the apparatus will not move forward, due to the inclination of the ground on which it is supported, during the driving movement of the pawl 116 with respect to the ratchet wheel 114, there is provided a locking pin 122 which is movable into engagement with an arm portion 124 formed on the pawl 116. The locking pin is moved into and out of engagement with the arm portion 124 by means of a diaphragm assembly 126 of a construction similar to the diaphragm assembly 96. The locking pin is moved in a direction out of locking engagement with the arm portion 124 by the spring action of the diaphragm assembly 126 and moved into locking engagement when the diaphragm assembly is communicated with a source of water under pressure. The diaphragm assembly 126 is connected to receive water under pressure from the inlet line and to discharge water under pressure to the outlet line at the same time as the diaphragm assembly 96 and to this end the lower central portion of the diaphragm assembly 126 is connected with the juncture of the conduits 108 and 110 through other suitable conduit 128.

Mounted in generally diametrically opposed relation to the pawl 116 is an anti-reversing pawl or dog 130. As shown, the pawl is pivoted to the casing 44, about a fixed axis, as indicated at 132, and is provided with a spring 133 for resiliently urging the pawl into a position of engagement with the peripheral teeth of the ratchet wheel.

The propelling mechanism also includes a brake assembly 134 which is operable to positively retain the apparatus against movement in either direction during the return stroke of the driving pawl 116. The brake assembly may be of any suitable construction and, as shown, comprises an arcuate brake shoe 136 pivoted at one end to a shaft 138 mounted in the casing 44. The brake shoe includes an arcuate brake lining 140 which is adapted to engage the upper surface of the rear axle 42 and is movable into and out of engagement therewith by means of a diaphragm assembly 142 of a construction similar to the diaphragm assembly 96. It will be noted that the brake assembly 134 is applied by the spring pressure of the diaphragm assembly 142 and released when the water under pressure is communicated with the diaphragm assembly. To this end a conduit 144 is communicated between the central lower end of the diaphragm assembly 142 and the conduit 128.

It can be seen that the brake assembly 134 will therefore be applied by the spring pressure of the diaphragm assembly 142 when no water under pressure is communicated therewith. In order to permit the apparatus to be transported other than by the propelling mechanism, the shaft 138 extends through the casing 44 and has a hand brake lever 146 fixedly secured thereto of conventional construction by which the brake assembly may be selectively retained in a released position.

The furrow follower steering mechanism, which serves to guide the apparatus during its travel by the propelling mechanism 20, includes an arm 148 having its rearward end pivotally mounted on the front axle 36 between the front wheels 38. Mounted in depending relation to the forward end of the arm 148 is a pair of runner elements 150 which are adapted to engage the sides of the furrow. The forward extremity of the arm 148 is provided with a vertical opening 152 to receive a hitch pin or the like. In this way, the arm 148 serves as a draft tongue connectible to a tractor or similar device by which the apparatus can be conveniently transported.

Figure 5:
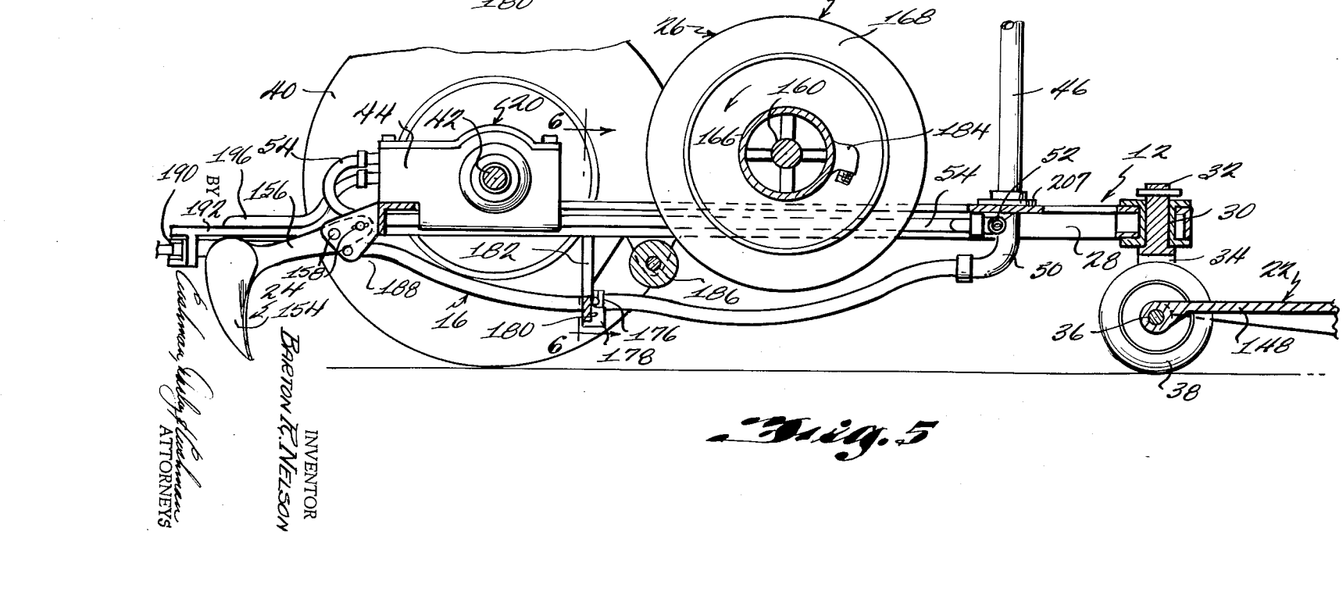
FIGURE 5 is a sectional view taken along the lines 5—5 of FIGURE 3, showing the position of the parts during the sprinkling operation.

The furrow opener assembly 24 includes a conventional furrow opener 154 mounted on the lower end of a standard 156, the upper end of which is pivotally mounted on the frame in trailing relation thereto. Any suitable means may be provided for moving and retaining the furrow opener in a lower operative furrow forming position and a raised inoperative position as, for example, a locking pin arrangement 158, as shown in FIGURE 5.

The reel assembly 26 includes a main reel shaft 160 journaled on the central portion of the frame platform 28, as by a pair of bearing blocks 162 or the like. Fixed to the central portion of the shaft 160 is a reel member 164 including a cylindrical hub portion 166 and a pair of annular flange portions 168 at opposite ends thereof. Preferably, the shaft of the reel member is connected with a clutch and gear reduction unit 170, of conventional construction, mounted on a bracket 172 pivoted to the frame platform 28 adjacent one side thereof. The input shaft of the unit 170 is preferably driven by an internal combustion engine 174 of conventional construction.

While it is preferred to utilize a self contained power unit to drive the reel 164 to wind up the hose thereon, it will be understood that other sources of power may be utilized, such as the power take-off of a tractor or the like. Moreover, while the reel assembly embodies a "dry center" type reel as described above, it is within the contemplation of the present invention to utilize a "wet center" reel. In this case, the central conduit of a wet center type reel would be connected directly to the pipe fitting 50. The dry center type, as described, is preferred since it is less costly and has less friction loss. However, with this arrangement it is necessary to change the connection of the end of the hose from the end of the pipe fitting 50 to the reel when it is desired to wind up the hose and to change from the reel to the fitting 50 when it is desired to commence operation.

Figure 6:
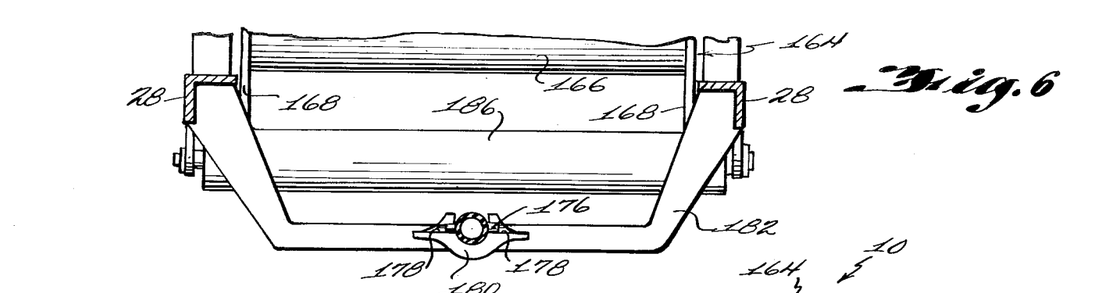
FIGURE 6 is an enlarged fragmentary sectional view taken along the line 6—6 of FIGURE 5.

In order to facilitate this operation a lug coupling 176 is fixed to the hose a short distance from the end thereof which is alternatively connectible to the fitting 50 and the reel member. As best shown in FIGURE 6, the diametrically opposed lugs of the coupling 176 are arranged to engage within a pair of hook-like notches 178 formed in a block 180. The block is mounted on a U-shaped frame 182, the free ends of the legs of which are rigidly attached to opposite sides of the frame platform 28. In this way, during the propelling of the apparatus, the load of the hose is transmitted to the apparatus through the lug coupling 176, the block 180 and the U-shaped frame 182. The portion of the hose extending forwardly of the coupling 176 will therefore not be under tension, so that the coupling at the extremity can easily be attached to and detached from the pipe fitting 50 and attached to and detached from a similar coupling element 184 fixed to the hub portion 166 of the reel member adjacent one of the end flanges 168.

To aid in collapsing the hose as it is wound up on the reel to insure that all of the contained water within the hose is removed as it is wound on the reel, there is provided an elongated roller 186 mounted in depending relation to the frame platform at a position between the reel assembly and the retaining block 180.

To aid in unwinding the hose and positioning the hose as it is unwound, there is provided an idler roller or pulley 188 which is mounted in depending relation on the rearward portion of the frame for rotational movement about a vertical axis. A second roller or pulley 190 is mounted for rotation about a vertical axis on the outer end of an arm 192 which extends laterally outwardly from one side of the frame adjacent the rear end thereof. Preferably, the arm 192 is mounted for pivotal movement, as indicated at 194, between an operative position wherein the arm extends in a generally horizontal plane and an inoperative position wherein the arm extends in a generally vertical plane. Any suitable means may be provided in the mounting bracket for retaining the arm in either of the above mentioned positions. Preferably, the arm 192 also serves to carry an outlet or discharge hose section 196 which is connected for communication at one end with the outlet hose section 64 and has its opposite end positioned adjacent the outer end of the arm 192 so as to discharge the water issuing from the propelling mechanism rearwardly of the apparatus.

In order to enjoy the benefits of the present invention most efficiently, it is preferable to utilize a specially constructed hose. When dealing with a hose of a length of approximately 600' and a diameter of approximately 3", it will be appreciated that the problem of disposing such a length of non-collapsible hose into a transportable bundle is virtually an insurmountable task. The weight of the contained water alone in such a length of hose would present problems of handling which would render the operation impractical. Consequently, the hose of the present invention must not only be flexible so that it can be wound up into a compact bundle for transportation, but it must also be collapsible so that during the winding operation substantially all of the water contained within the hose can be squeezed out. In order to most efficiently carry out this concept the hose should be collapsible throughout its length, that is, it should be in one continuous length free from rigid non-collapsible couplings. Consequently, the hose should be capable of being repaired, in the event it is damaged, in such a way that the coupling of the repaired part is collapsible. The hose desirably should be smooth along its outer periphery so that it can be pulled along the ground relatively easily and, at the same time, be abrasive resistant. It should not mildew when, for eaxmple, it is wound up into its transportable bundle formation, and finally, it should be relatively inexpensive.

Figure 13:
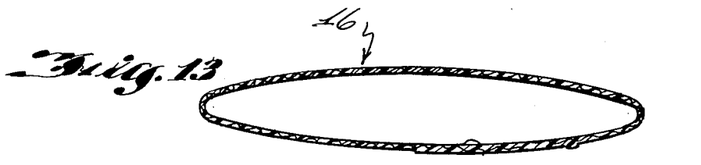
FIGURE 13 is a cross-sectional view of the hose.
Figure 14:
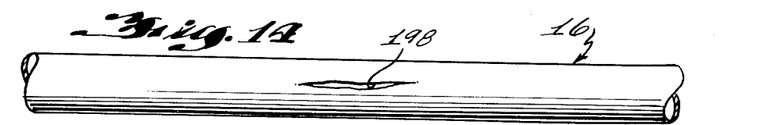
FIGURES 14–18 are fragmentary side elevational views showing the manner in which a damaged portion of the hose is repaired.

In FIGURES 12–18 there is illustrated a hose construction and a method of repair which meet the above preferred criteria. As best shown in FIGURE 13, the hose is preferably made from a length of woven material imbedded between a relatively thick inner layer and a relatively thin outer layer of a thermoplastic resin with the longitudinal marginal edges of the imbedded woven material heat sealed in overlapping relation.

In a preferred embodiment the diameter of the hose when expanded is approximately 3" and when collapsed in flat condition has a thickness of approximately 0.3". The woven fabric used as reinforcing may be made of any suitable material, a preferred material being nylon. The thermoplastic material between which the woven material is imbedded may be resin, rubber or the like, with resin being preferred.

Figure 15:
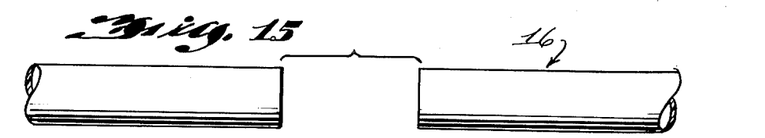
Figure 16:
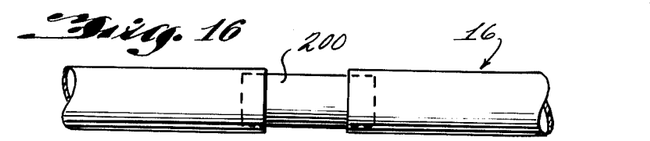
Figures 17, 18:
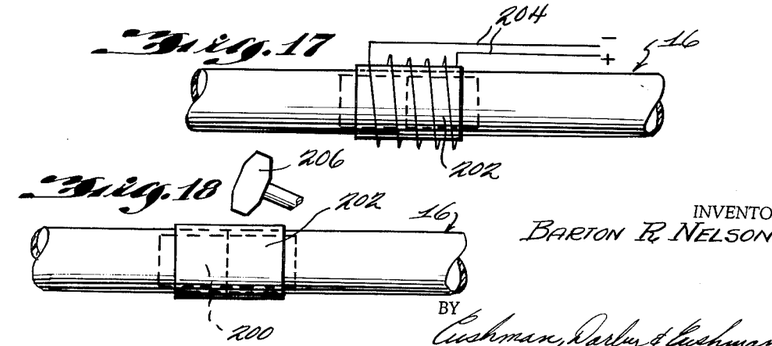

Referring now more particularly to FIGURES 14–18, with such a hose construction if damage does occur which would result in a leak as indicated at 198, the hose can be repaired by following the simple steps pictorially represented in FIGURES 15–18. First, the damaged section is simply cut out with a suitable cutting tool, such as a knife or scissors, as shown in FIGURE 15. Next, a frangible internal mandrel 200 is inserted within both ends of the hose where the damaged section has been removed and then the two ends are moved together over the mandrel in abutting relation. The mandrel may be of any suitable frangible material, such as plaster of Paris or the like. Next, additional resin with woven fabric imbedded therebetween are applied over the abutting ends to form a sleeve therearound, as indicated at 202, and then suitable heat is applied, as schematically illustrated in FIGURE 17 at 204, to vulcanize or heat seal the outer sleeve 202 to the outer periphery of the abutting ends of the hose. Finally, after the sleeve 202 has suitably cooled, the frangible mandrel 200 is broken up, as by applying blows or the like with a suitable instrument, such as a hammer 206. Once the mandrel is fractured it can be removed from within the hose simply by flushing it out with water. In this way leaks in the hose can be easily repaired while still retaining the flexible and collapsible characteristics of the host throughout its entire length.

Figures 1, 2:
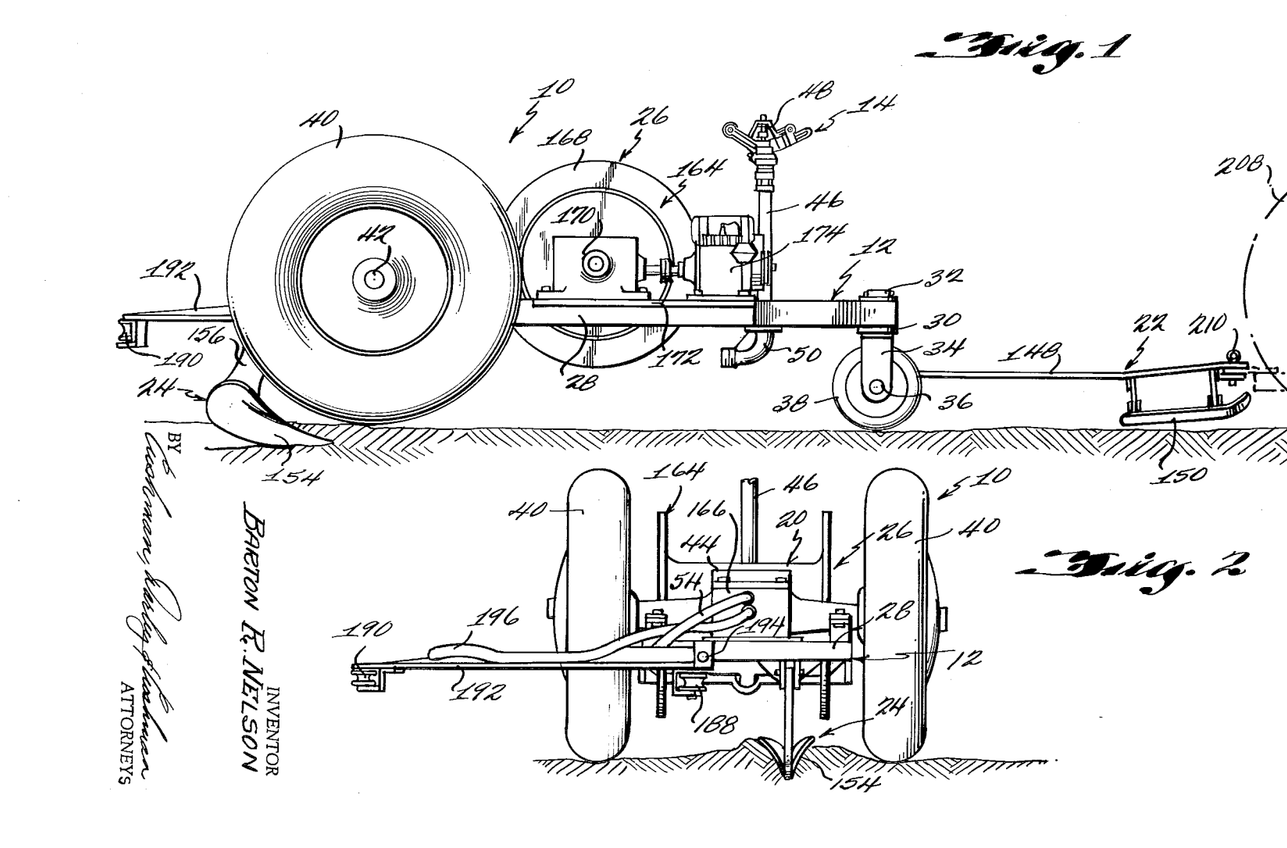
FIGURE 1 is a side elevational view of a traveling sprinkler apparatus embodying the principles of the present invention illustrating the position of the parts during the initial furrow forming operation.
FIGURE 2 is a rear elevational view of the apparatus shown in FIGURE 1.

Referring now more particularly to FIGURES 19–21, the procedure of the method of the present application and preferred mode of operation of the apparatus of the present invention will now be described. It will be understood that the field to be irrigated must be provided with a source of water under pressure. This source may be simply a pump drawing water from a pond or the like, or it may be pipes installed in the field. It is contemplated that the present apparatus may have a total weight of 5 tons or over, including the weight of the hose wound around the reel assembly 26. Since the propelling mechanism 20 is capable of propelling the device by itself at a very slow speed (for example 1 to 6 strokes per minute depending upon the manual setting of a throttle valve 207 in fitting 50), it is preferred to transport the apparatus from one operative position in the field to another by means of a conventional tractor or the like, such as the tractor 208 schematically illustrated in FIGURE 20. As shown in FIGURE 1, when the arm 148 of the steering mechanism is connected to the drawbar of the tractor, as by a pin 210, the furrow follower 150 is retained in a position above the ground. In order to permit the rear wheels to freely rotate, the brake lever 146 is moved into a position to release the brake. Thus, assuming that the above parts are positioned in the manner indicated, that the hose 16 is wound into a compact bundle free of contained water on the reel assembly 26 and that the furrow opener 156 is disposed in its raised position, the apparatus is first moved into the field by the tractor into a position disposed from the source of water under pressure 18 a distance approximately equal to the length of the hose or in the present example approximately 600′. At this point, the furrow opener 154 is moved into its lower operative furrow forming position, as shown in FIGURE 1, and the apparatus is pulled by the tractor from its initial position toward the water pressure source 18 so as to form a first portion 212 of an elongated furrow. When the tractor has moved the apparatus to a position adjacent the source or just past the source, as shown in solid lines in FIGURE 20, the clutch of the unit 170 is actuated to permit free rotative movement of the reel assembly 26. The free end of the hose is then connected in communication with the water pressure source 18.

After the free end of the hose has been connected to the source, the arm 192 is moved down into its horizontal position and the hose between the end connected to the water pressure source 18 and the reel assembly is trained over the rollers 190 and 188 in the manner shown in FIGURES 5 and 19. The tractor 208 is then operated to pull the apparatus 10 along to form a continuous second portion 212′ of the furrow in a direction away from the source 18. During this movement, the rollers 188 and 190 serve to guide and deposit the hose as it is pulled and unwound from the reel assembly in a position parallel to the second portion 212′ of the furrow a distance greater than one-half the width between the rear wheels 40. The apparatus is pulled along by the tractor for a distance again approximately equal to the length of hose, in the present instance approximately 600′. During this travel the entire length of hose will be unwound from the reel 164 and disposed in parallel relation to the furrow at a position out of the path of travel of the apparatus along the furrow.

After the second portion 212′ of the continuous furrow has been formed, the end of the hose is uncoupled from the fitting 184 on the reel member 164 and the furrow former is moved into its raised position. Next, the apparatus 10 is turned around by the tractor until it is disposed into a position such as shown in dotted lines in FIGURE 20. The tractor can then be uncoupled from the steering arm 148, allowing the furrow follower 150 to move downwardly into engagement with the furrow. The coupling 176 adjacent the end of the hose is then placed within the saddle block 180 and the coupling at the extremity thereof is connected in communication with the fitting 50. The brake lever 146 is moved into its operative position, permitting the brake assembly to be operable under the control of the diaphragm assembly 142 and the apparatus is now ready to be communicated with the source of water under pressure.

It will be understood that when water under pressure is allowed to flow through the hose 16 into the fitting 50, this water will be communicated with the propelling assembly 20 and the sprinkler assembly 14. Under these circumstances, the apparatus will propel itself through the operation of the propelling assembly 20 and the steering assembly 22 along a path conforming to the elongated contour of the continuous furrow formed by the portions 212 and 212′. It will be seen that length of travel along the first portion 212 of the furrow is limited by the length of the hose. At the end of the travel, the source of water is cut off and the end of the hose is uncoupled from the fitting 50 and coupled to the reel coupling 184. As previously indicated, this operation can be easily effected since the portion of the hose between the extremity and the lug coupling 176 will not be under tension and the pull of the hose is from the apparatus through the coupling 176, and U-shaped frame 182.

As soon as the coupling of the hose to the fitting 184 has been completed and the end of the hose attached to the water source has been uncoupled, the reel assembly can be actuated to wind up the hose thereof. To this end, the internal combustion engine 174 is started and the clutch of the speed reducer unit 170 is engaged to drive the reel. As the hose is reeled in on the hub of the reel member it passes over the roller 186 which causes the same to collapse into a flat condition, thus progressively forcing the water contained within the hose outwardly of the free end thereof.

Desirably, the arrangement at the source is such as to provide an automatic cut-off of the water source when the apparatus has reached the end of its travel. An example of such a shut-off mechanism is illustrated in FIGURE 21 wherein a valve mechanism 214 is provided upstream from the connection of the hose 16 with the source. The valve mechanism may be of any conventional design and, as shown, is a rotary valve having an arm 216 thereon which extends vertically when the valve is open and horizontally when the valve is closed. A chain 218 is connected to the outer end of the valve arm 216 and has its opposite end connected to the hose 16 at a position spaced from the adjacent end thereof. When the valve is open and the valve arm is disposed vertically as shown in FIGURE 19, a pull on the end of the hose attached to the water pressure source 18, as when the apparatus reaches the full extent of its travel away from the source, will cause a commensurate pull on the chain 218 and this will move the valve arm into the position shutting off the flow of water. Preferably, the water pump of the source (not shown) is provided with a pressure sensitive switch (not shown) which senses the closing of the valve 214 and interrupts the power to the pump. Alternatively, the valve 214 may be a small control valve which merely diverts some of the flow in the source to a hydraulic control valve, which, when pressurized, serves to shut off the water.

It can thus be seen that the present invention provides a system of sprinkler irrigation which requires a minimum of manual labor to set up and operate. The entire apparatus, while constituting a heavy piece of equipment (in the neighborhood of 5 tons) is readily transportable by means of a tractor or the like, which is usually available. The capacity of the unit is such that it can handle approximately 40 to 80 acres and the construction is such that it can be produced such that the expense to the farmer would be easily justified. It is contemplated that a complete, self-propelled run of the machine through, for example, approximately a 1200′ path, may take as much as 48 hours. Consequently it is desirable to use the water as the propelling force, since it is positively acting and does not require replenishment of fuel such as would be the case with an internal combustion engine. With the water pressure actuated assembly 20 provided, simple squeeze hose valving is provided, which should be relatively trouble-free and by the utilization of diaphragm the leakage problems which are presented by piston and cylinder assemblies are eliminated.

The furrow follower assembly for steering the self-propelled apparatus is regarded to be most effective, since it permits a path of travel twice that of the hose length. In sandy and sandy-loam soils there should be no problem because of water in the furrow, and consequently a full circle sprinkler can be utilized. In clay soils, it may be desirable to utilize a sprinkler of the type mentioned in Patent 3,022,012, with less than a full circle pattern, so that no water would be sprayed into the furrow in front of the apparatus.

Because of the great weight of the apparatus it is essential that complete control of the movement of the apparatus during its self-propelled travel be maintained at all times. The propelling assembly 20 described above meets this requirement, since the locking pin 122 will prevent movement of the ratchet wheel with respect to the driving pawl 116 during the driving movement of the latter and the idler pawl 130 and brake assembly 134 will prevent movement of the ratchet wheel during the return movement of the driving pawl 116.

As previously mentioned, the utilization of a flexible and collapsible hose which is capable of being wound up into a compact transportable bundle free of contained water is greatly preferred in order to provide an apparatus which is capable of the type of capacity operation required in field irrigation where a length of hose of the order of 600' is required.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A method of irrigating an area of a field having a preformed furrow therein and a source of water under pressure at a position adjacent said furrow with the use of a self propelled steerable irrigating device carrying sprinkler head means and a length of flexible collapsible hose which comprises the steps of transporting said hose on said device in a collapsed wound-up condition free of contained water from a position remote from said source to a position adjacent said source by moving said device thereto, positioning one end of said hose at said source, moving said device in one direction away from said source along a first portion of the furrow a distance generally equal to the length of the hose while progressively positioning the hose parallel to the first portion of said furrow, communicating the source of water under pressure with said sprinkler head means through said hose while said device is disposed at the end of the first portion of said furrow so as to operate said sprinkler head means to irrigate the adjacent area over which the latter is carried, propelling said device in a direction toward said water source position to progressively irrigate the adjacent area of the field, steering the propelled device by sensing the elongated contour of said furrow so that device follows a path conforming to the furrow, discontinuing the propelling of the device after it has traveled along said furrow a distance at most generally equal to twice the length of said hose, disconnecting said hose from the source of water under pressure, and progressively collapsing and winding up the hose into a transportable bundle on said device free of contained water.

2. A method of irrigating an area of a field having a source of water under pressure available at a predetermined position therein with the use of a self-propelled steerable irrigating device carrying sprinkler head means and a length of flexible collapsible hose which comprises the steps of transporting said hose on said device in a collapsed wound-up condition free of contained water from a position remote from said source to a position adjacent said source by moving said device thereto generally in one direction while simultaneously forming a first portion of a furrow in the field of a length generally equal to the length of said hose progressively in a direction toward the predetermined source position, positioning one end of the hose at said predetermined source position, moving said device generally in said one direction away from said source position forming a continuous second portion of the furrow of a length generally equal to the length of said hose progressively in a direction away from the predetermined source position and simultaneously progressively unwinding and positioning the hose in generally parallel relation to the second portion of the furrow, positioning the device at the end of said second portion of the furrow, communicating the source of water under pressure with said sprinkler head means through said hose while said device is positioned at the end of said second portion of the furrow so as to operate said sprinkler head means to irrigate the adjacent area over which the latter is carried; propelling the device in a direction toward said predetermined source position to progressively irrigate the adjacent area of the field, steering the propelled device by sensing the elongated contuor of the furrow so that the sprinkling device follows a path conforming to the furrow, discontinuing the propelling of the device at the opposite end of the furrow, disconnecting the hose from the source of water under pressure and progressively collapsing and winding up the hose into a transportable bundle on said device free of contained water.

References Cited by the Examiner

UNITED STATES PATENTS

| | | | |
|---|---|---|---|
| 1,111,243 | 9/1914 | Whitworth | 172—26 |
| 1,943,152 | 1/1934 | Weiss | 239—1 |
| 2,392,408 | 1/1946 | Radonich | 239—1 |
| 2,570,573 | 10/1951 | Liboiron | 239—178 |
| 2,624,689 | 1/1953 | Peters et al. | 156—94 |
| 2,726,895 | 12/1955 | Behlen | 239—181 |
| 2,800,364 | 7/1957 | Dick et al. | 239—178 |
| 2,880,937 | 4/1959 | King | 239—181 |
| 2,924,546 | 2/1960 | Shaw | 156—94 |
| 2,931,579 | 4/1960 | Ruddell | 239—179 |
| 3,009,645 | 11/1961 | Nugent | 239—179 |
| 3,082,883 | 3/1963 | Smeal | 239—164 |

FOREIGN PATENTS 236,264  11/1961  Australia.

ABRAHAM G. STONE, *Primary Examiner.*

EVERETT W. KIRBY, *Examiner.*

D. L. MOSELEY, J. O. BOLT, *Assistant Examiners.*